United States Patent
Huang

(10) Patent No.: US 10,539,811 B2
(45) Date of Patent: Jan. 21, 2020

(54) EYEGLASSES HAVING HIDDEN PIVOT STRUCTURE

(71) Applicant: Yi-Chi Huang, Tainan (TW)

(72) Inventor: Yi-Chi Huang, Tainan (TW)

(*) Notice: Subject to any disclaimer, the term of this patent is extended or adjusted under 35 U.S.C. 154(b) by 25 days.

(21) Appl. No.: 15/900,952

(22) Filed: Feb. 21, 2018

(65) Prior Publication Data
US 2019/0258078 A1    Aug. 22, 2019

(51) Int. Cl.
*G02C 5/14* (2006.01)
*G02C 5/22* (2006.01)

(52) U.S. Cl.
CPC ............... *G02C 5/22* (2013.01); *G02C 5/14* (2013.01); *G02C 5/146* (2013.01); *G02C 5/2209* (2013.01)

(58) Field of Classification Search
CPC . G02C 5/14; G02C 5/146; G02C 5/22; G02C 5/16; G02C 5/2209; G02C 5/2218; G02C 5/2245; G02C 5/2254; G02C 5/2272
USPC ............ 351/121, 63, 111, 118, 158
See application file for complete search history.

(56) References Cited

U.S. PATENT DOCUMENTS 5,898,471 A * 4/1999 Simioni ............... G02C 5/2209
16/228
2005/0225717 A1* 10/2005 Reane ................. G02C 5/2209
351/153
2011/0317123 A1* 12/2011 Li ............................ G02C 5/10
351/140
2014/0063442 A1* 3/2014 Cody ....................... G02C 5/22
351/153
2014/0368785 A1* 12/2014 Li .......................... G02C 3/003
351/121

FOREIGN PATENT DOCUMENTS

JP          3212856    *   9/2017
TW          M259179 U      3/2005

* cited by examiner

*Primary Examiner* — Jordan M Schwartz
(74) *Attorney, Agent, or Firm* — Rosenberg, Klein & Lee

(57) ABSTRACT

Eyeglasses having a hidden pivot structure include a frame and two temples. The frame has a first inner surface and a first outer surface. Two sides of the frame have first end surfaces, respectively. The first end surfaces are adjacent to the first inner surface and the first outer surface, respectively. Each first end face is formed with two engaging recesses. The engaging recesses are connected to the first inner surface. The two temples are pivotally connected to the frame. Each temple has a second inner surface and a second outer surface. Each temple has a second end surface. The second end surface is adjacent to the second inner surface and the second outer surface. The second end face is formed with two engaging blocks. When the two temples are unfolded relative to the frame, the engaging blocks are engaged in the engaging recesses, respectively.

6 Claims, 5 Drawing Sheets

EYEGLASSES HAVING HIDDEN PIVOT STRUCTURE

FIELD OF THE INVENTION

The present invention relates to eyeglasses, and more particularly to eyeglasses having a hidden pivot structure that has engaging blocks to be engaged in engaging recesses in a hidden manner to provide a positioning effect when temples are unfolded relative to a frame.

BACKGROUND OF THE INVENTION

Most of common eyeglass structures use screws to assemble the temples with the frame. However, the combination of screws is troublesome, which not only consumes materials but also increases assembly time. Therefore, it is quite inconvenient for manufacture and assembly. There is a structure that uses engaging studs and engaging holes to mate with each other, such that the frame and the temples can be assembled without using screws. However, for the glasses structure without screws, when in use, the front ends of the temples abut against the two sides of the frame to main the angles of the temples when unfolded. When the temples are unfolded beyond the limit, the engaging studs of the temples may disengage from the engaging holes of the frame to lose the pivot fixing function.

Taiwan Utility Model No. M259179 entitled "glasses capable of mounting temples stably" published on Mar. 11, 2005 is disclosed, comprising a lens unit and temples which are pivotally connected to two pivot portions of the lens unit. When the temples are unfolded, the frame and the lens unit abut against each other by corresponding abutting surfaces. The pivot portion is provided with two spaced stop blocks at upper and lower ends thereof. Each stop block has a stop groove with an opening facing rearward and a stop surface. Each temple has two support shafts to be inserted into the pivot holes of the lens unit and contact surfaces to be in contact with the stop surfaces of the stop blocks of the frame when the temple is unfolded. Through the engagement of the two abutting surfaces as well as the engagement of the contact surface and the stop surface, the temples can be assembled stably.

In the aforesaid patent, the pivot portions further have two upper and lower spaced grooves. The grooves extend to the corresponding stop grooves. Each temple has two upper and lower spaced protruding shafts horizontally extending towards the lens unit, a first stopper extending from the lower protruding shaft, and a second stopper extending from the upper protruding shaft. The first stopper has a first contact surface, and the second stopper has a second contact surface corresponding to the first contact surface. The first stopper and the second stopper are inserted into the corresponding stop grooves, respectively. The first stopper and the second stopper abut against extension pieces respectively, thereby preventing the support shafts from disengaging from the pivot holes due to torsion.

The aforesaid patent has the mechanism to prevent the support shafts from disengaging from the pivot holes. However, the first stopper and the second stopper are disposed at the forefronts of the protruding shafts, respectively. This not only influences the overall appearance and is complicated for manufacture. In particular, after the temples are unfolded many times, the first stopper and the second stopper may be damaged because of the excessive force of unfolding the temples. In general, the eyeglass lenses are performed with a coating surface treatment in order to increase the degree of the surface hardening of the lenses, thereby providing a wear-resistant effect. In the aforesaid patent, after the lens unit is immersed in the coating solution, the interior of the stop groove of the lens unit is a closed structure so that the coating solution is adsorbed to the stop groove due to vacuum suction. As a result, after the coating process is completed and the lens unit is heated and dried, the stop groove may be clogged with the dried coating, so the first stopper and the second stopper cannot be inserted into the stop grooves. It is not perfect for use. Accordingly, the inventor of the present invention has devoted himself based on his many years of practical experiences to solve these problems.

SUMMARY OF THE INVENTION

In view of the shortcomings of the prior art, the primary object of the present invention is to provide eyeglasses having a hidden pivot structure. The eyeglasses of the present invention comprise a frame and two temples. The frame has a first inner surface and a first outer surface. Two sides of the frame have first end surfaces, respectively. The first end surfaces are adjacent to the first inner surface and the first outer surface, respectively. Two sides of the first inner surface of the frame have first pivot portions, respectively. Each of the first pivot portions is provided with two pivot blocks. The pivot blocks have pivot holes, respectively. Each of the first end faces is formed with two engaging recesses. The engaging recesses are connected to the first inner surface. The two temples are pivotally connected to the two sides of the frame. The two temples each have a second inner surface and a second outer surface. The two temples each have a second end surface. The second end surface is adjacent to the second inner surface and the second outer surface. A second pivot portion protrudes from the second inner surface. The second pivot portion has two pivot members. The pivot members are provided with pivot shafts, respectively. The pivot shafts are pivotally connected to the pivot holes, respectively. The second end face is formed with two engaging blocks. The engaging blocks are adjacent to and connected to the pivot members, respectively. When the two temples are unfolded relative to the frame, the engaging blocks are engaged in the engaging recesses, respectively.

Preferably, the two pivot blocks are connected to the first inner surface and located close to upper and lower ends of the first inner surface.

Preferably, the two pivot members are connected to the second inner surface and located close to upper and lower ends of the second inner surface.

Preferably, the engaging recesses are disposed between the two pivot blocks.

Preferably, the two engaging recesses are transversely formed close to upper and lower ends of the two first end faces, and the engaging recesses are located at the junction of the first inner surface and the first end surfaces to form an open structure.

Preferably, the two engaging blocks are transversely formed close to upper and lower ends of the second end face.

According to the foregoing technical features, the present invention has the following effects:

1. When the two temples are unfolded relative to the frame to the limit, the engaging blocks of the two temples are engaged in the engaging recesses to form a positioning. This is more stable for the user to wear eyeglasses.

2. When the user wears the eyeglasses, in the case that the frame and the two temples are impacted by an external force, the two temples won't be loosened by the impact duce to the engagement and reinforcement of the engaging blocks and the engaging recesses, so that the temples and the frame will not be easily separated to ensure its integrity.

3. The engaging blocks are engaged in the engaging recesses in a hidden manner and won't extend out of the frame to maintain the overall aesthetic appearance.

4. The overall manufacture and assembly of the frame and the temples are simple and easy. The engaging blocks and the engaging recesses are small in size. Therefore, the material can be saved and the manufacturing cost can be reduced.

5. The engaging blocks are disposed between the second end surface and the adjacent pivot members, providing a reinforcing effect. Even if the temples are unfolded many times, the engaging blocks will not lose the function due to the collapse.

6. The engaging recesses are in the form of an open structure. In the surface coating process, the coating solution will not be adsorbed in the engaging recesses because of vacuum suction. Therefore, after the coating is dried, it does not hinder the engaging blocks from being engaged in the engaging recesses to form a positioning effect.

DETAILED DESCRIPTION OF THE PREFERRED EMBODIMENTS

Embodiments of the present invention will now be described, by way of example only, with reference to the accompanying drawings.

Figure 1:
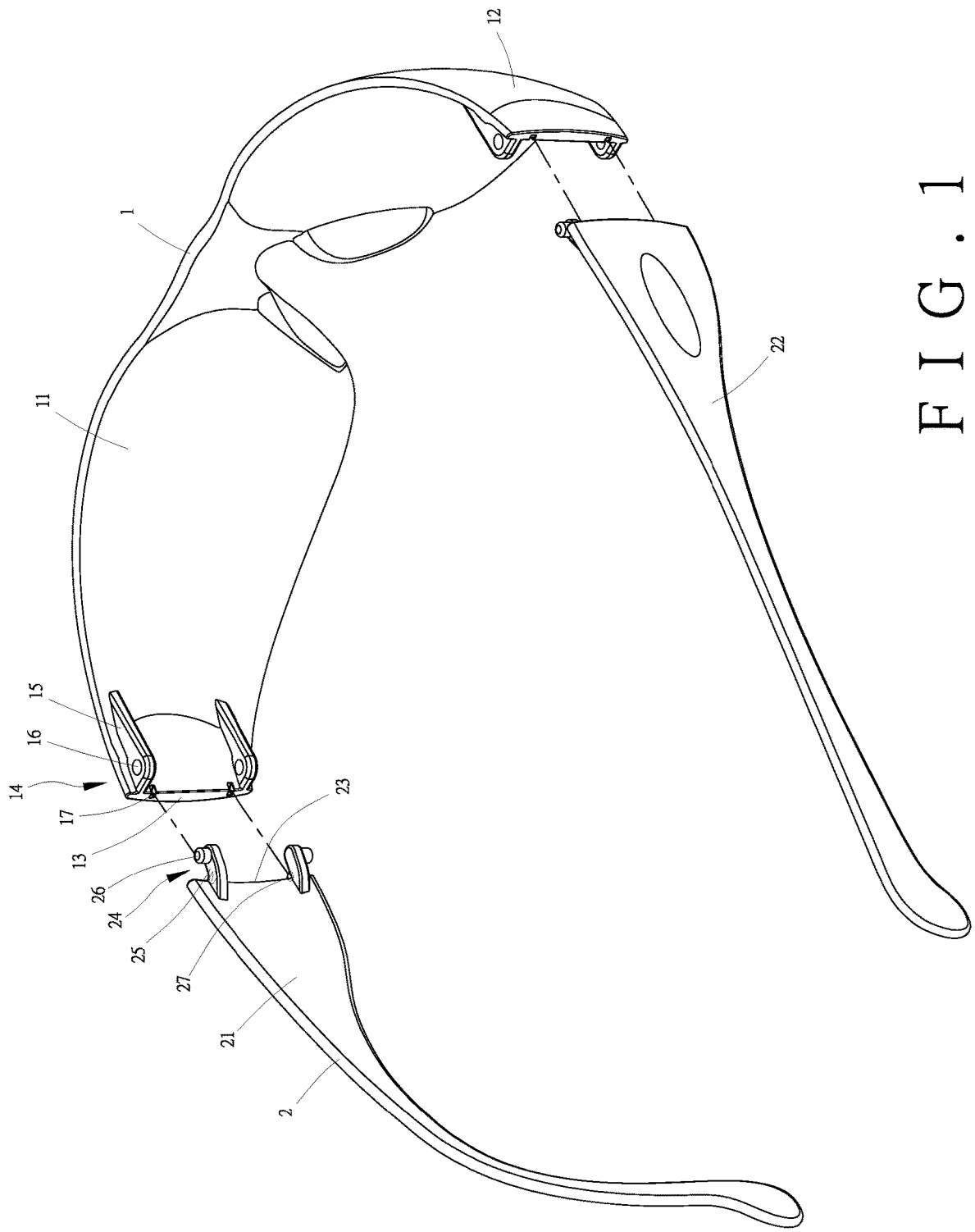
FIG. 1 is an exploded view according to a preferred embodiment of the present invention.
Figure 2:
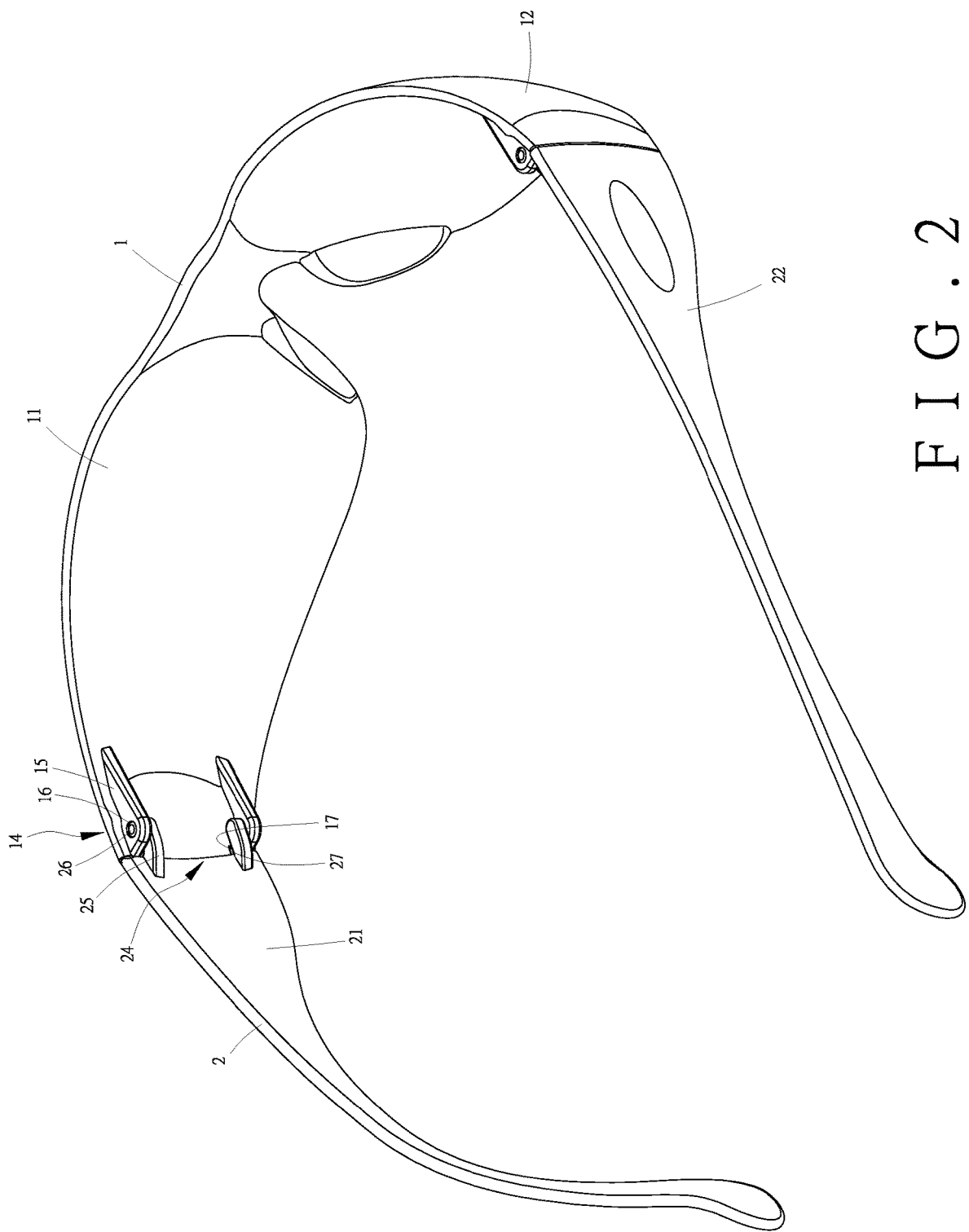
FIG. 2 is a perspective view according to the preferred embodiment of the present invention.

Referring to the FIG. 1 and FIG. 2, the embodiment of the present invention comprises a frame (1) and two temples (2).

The frame (1) has a first inner surface (11) and a corresponding first outer surface (12). Two sides of the frame (1) have first end surfaces (13), respectively. The first end surfaces (13) are adjacent to the first inner surface (11) and the first outer surface (12), respectively. Two sides of the first inner surface (11) of the frame (1) have first pivot portions (14), respectively. Each of the first pivot portions (14) is provided with two pivot blocks (15) connected to the first inner surface (11) and located close to upper and lower ends of the first inner surface (11). The pivot blocks (15) have pivot holes (16) opposite to each other. Each of the first end faces 13 is transversely formed with two engaging recesses 17 (as shown FIG. 3) close to upper and lower ends thereof. The engaging recesses (17) are transversely connected to the first inner surface 11, so that the engaging recesses (17) are located at the junction of the first inner surface (11) and the first end surface (13) to form an open structure. The engaging recesses (17) are disposed between the two pivot blocks (15) of the first pivot portion (14).

Figure 4:
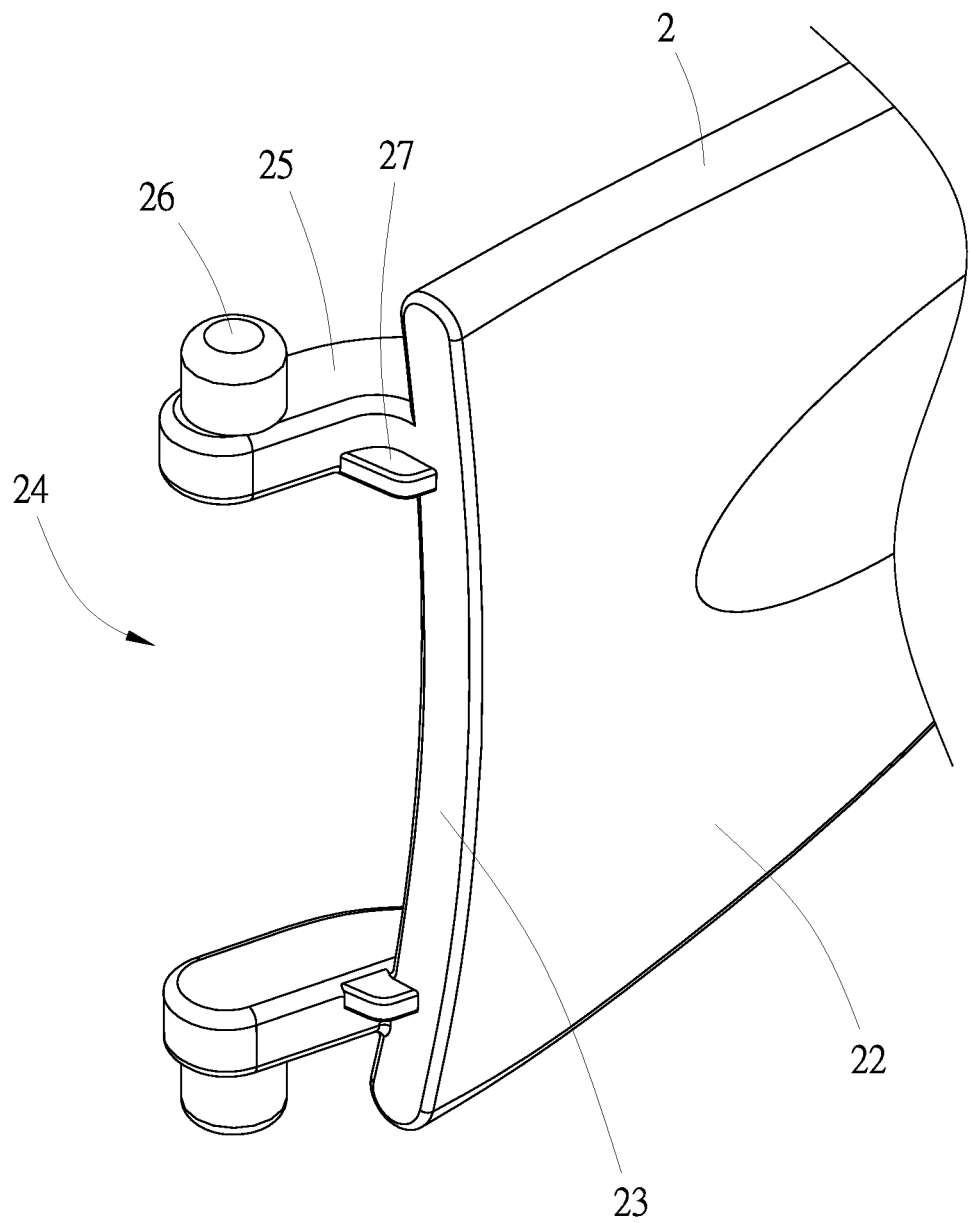
FIG. 4 is an enlarged schematic view showing the second pivot portion of the temple according to the preferred embodiment of the present invention.
Figure 5:
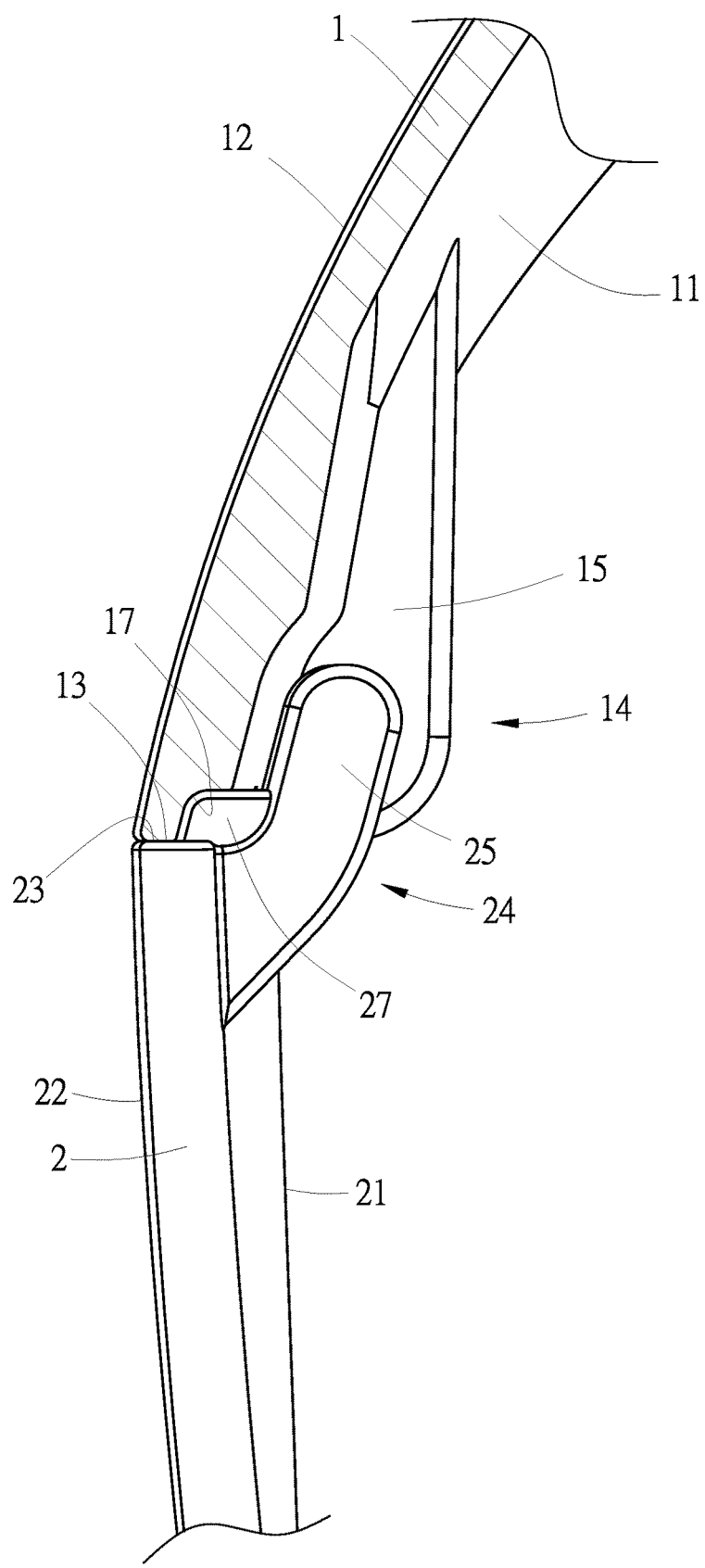
FIG. 5 is a sectional view showing the engaging block engaged in the engaging recess according to the preferred embodiment of the present invention.

The two temples (2) are pivotally connected to the two sides of the frame (1). The two temples (2) each have a second inner surface (21) and a corresponding second outer surface (22). The two temples (2) each have a second end surface (23). The second end surface (23) is adjacent to the second inner surface (21) and the second outer surface (22). A second pivot portion (24) protrudes from the second inner surface (21) of each temple (2). The second pivot portion (24) has two pivot members (25) connected to the second inner surface (21) and located close to upper and lower ends of the second inner surface (21). The pivot members (25) are provided with pivot shafts (26), respectively. The pivot shafts (26) are pivotally connected to the pivot holes (16) respectively so that the two temples (2) can be pivotally unfolded or folded relative to the frame (1) respectively. The second end face 13 is transversely formed with two engaging blocks (27) (as shown in FIG. 4) close to upper and lower ends thereof. The engaging blocks (27) are adjacent to and connected to the pivot members (25), respectively. When the two temples (2) are unfolded relative to the frame (1) respectively, the engaging blocks (27) are engaged with the engaging recesses (17) respectively to form a positioning.

Figure 3:
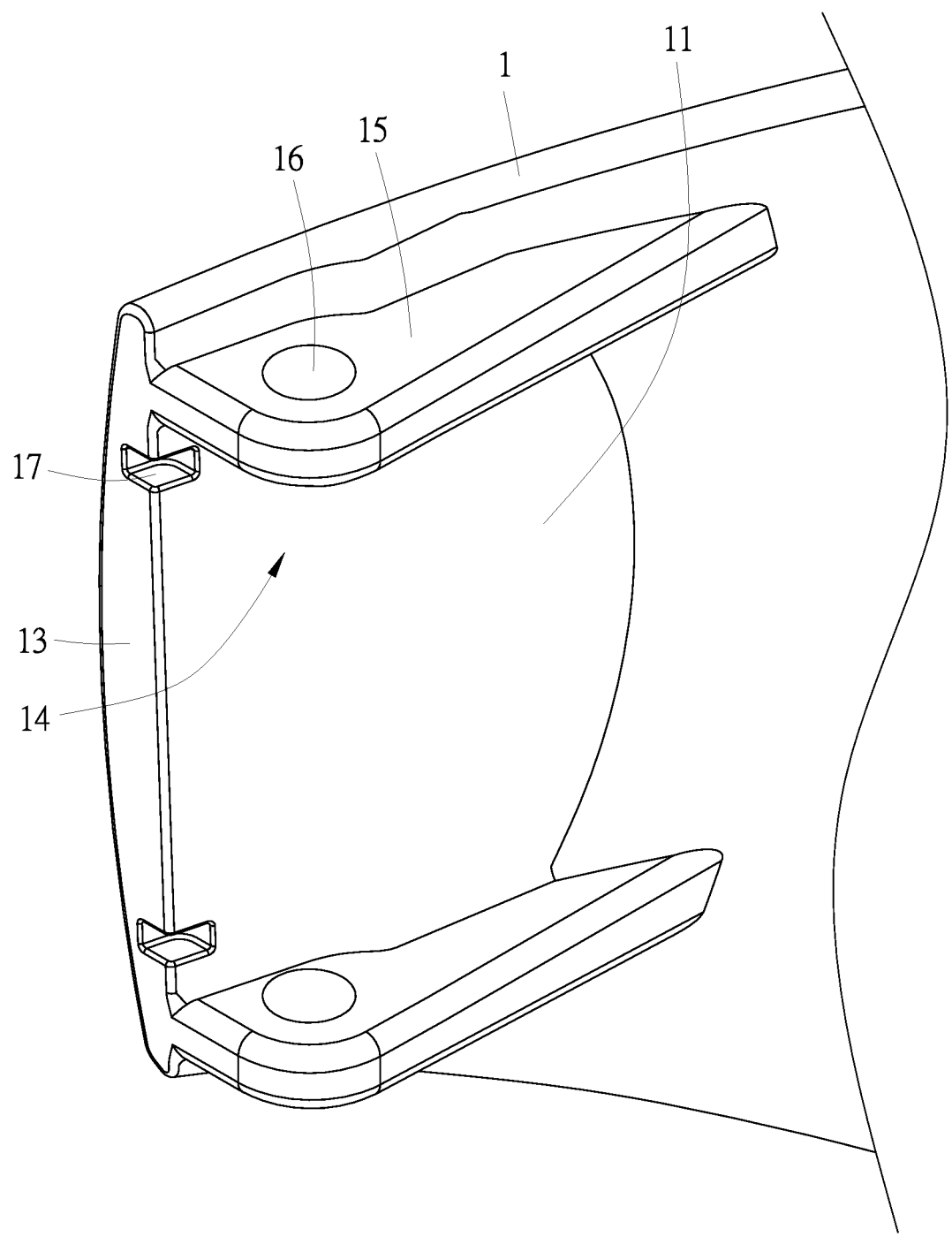
FIG. 3 is an enlarged schematic view showing the first pivot portion of the frame according to the preferred embodiment of the present invention.

To assemble the present invention, as shown in FIG. 2, FIG. 3 and FIG. 4, the two second pivot portions (24) of the two temples (2) correspond to and are in movable contact with the first pivot portions (14) at the two sides of the frame (1) respectively, such that the pivot shafts (26) of the pivot members (25) are compressed by the pivot blocks (15) of the first pivot portions (14) for the pivot members (25) to be elastically compressed. When the pivot shafts (26) of the two second pivot portions (24) are aligned with the pivot holes (16) of the two first pivot portions (14) respectively, the elastic forces of the pivot members (25) of the two second pivot portions (24) enable the pivot shafts (26) to be inserted into the pivot holes (16) respectively, such that the two temples (2) can be pivotally unfolded or folded relative to the frame (1).

When in use, the two temples (2) are unfolded relative to the frame (1) respectively. When the two temples (2) are unfolded to the limit, the engaging blocks (27) of the two temples (2) are engaged in the engaging recesses (17) to form a positioning. This is more stable for the user to wear eyeglasses. In particular, in the case that the frame (1) and the two temples (2) are impacted by an external force, the two temples (2) won't be loosened and detached from the frame (1) easily so as to ensure its integrity.

Therefore, when the two temples (2) are unfolded, the engaging blocks (27) can be engaged in the engaging recesses (17) in a hidden manner and cannot be seen from the outside, so that the overall aesthetic appearance of the frame (1) and the two temples (2) can be maintained. Moreover, the engaging blocks (27) and the engaging recesses (17) are small in size, and do not require much material, and are relatively simple and easy in manufacture. Therefore, the material can be saved and the manufacturing cost can be reduced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. Eyeglasses having a hidden pivot structure, comprising:
   a frame having a first inner surface and a first outer surface, two sides of the frame having first end surfaces respectively, the first end surfaces being adjacent to the first inner surface and the first outer surface respectively, the frame having upper and lower first pivot portions at each of two sides of the first inner surface thereof, each of the upper and lower first pivot portions including a pivot blocks having a pivot hole, each of the first end surfaces being formed with two engaging recesses extending into the first inner surface; and two temples pivotally connected to the two sides of the frame, the two temples each having a second inner surface, a second outer surface, and a second end surface adjacent to the second inner and outer surfaces, each of the temples having upper and lower second pivot portions protruding from the second inner surface, each of the upper and lower second pivot portions having a pivot members extending to support a pivot shafts spaced away from the second end surface and pivotally connected to one of the pivot holes, each of the temples being formed with two engaging blocks, each of the engaging blocks disposed in contact with the second end surface and adjacent to and connected to one of the pivot members;

wherein when the two temples are unfolded relative to the frame, the engaging blocks are engaged in the engaging recesses respectively.

2. The eyeglasses as claimed in claim 1, wherein at each side of the first inner surface of the frame the two pivot blocks are connected to the first inner surface and located close to upper and lower ends of the first inner surface.

3. The eyeglasses as claimed in claim 1, wherein the two pivot members of each of the temples are connected to the second inner surface and located close to upper and lower ends of the second inner surface.

4. The eyeglasses as claimed in claim 1, wherein at each side of the first inner surface of the frame the engaging recesses are disposed between the two pivot blocks.

5. The eyeglasses as claimed in claim 1, wherein at each side of the first inner surface of the frame the two engaging recesses are transversely formed close to upper and lower ends of the first end surface located at the junction of the first inner surface and the first end surface to form open structures.

6. The eyeglasses as claimed in claim 1, wherein the two engaging blocks of each of the temples are transversely formed close to upper and lower ends of the second end surface thereof.

* * * * *